US008713060B2

(12) United States Patent
Sivasubramanian et al.

(10) Patent No.: US 8,713,060 B2
(45) Date of Patent: *Apr. 29, 2014

(54) CONTROL SERVICE FOR RELATIONAL DATA MANAGEMENT

(75) Inventors: Swaminathan Sivasubramanian, Seattle, WA (US); Grant A. M. McAlister, Seattle, WA (US); Paul David Franklin, Seattle, WA (US); Rajesh Sudhakar Sheth, Bellevue, WA (US); James Horsley, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 384 days.

This patent is subject to a terminal disclaimer.

(21) Appl. No.: 12/415,958

(22) Filed: Mar. 31, 2009

(65) Prior Publication Data

US 2010/0251242 A1    Sep. 30, 2010

(51) Int. Cl.
*G06F 17/30* (2006.01)
(52) U.S. Cl.
USPC .......................................................... 707/792
(58) Field of Classification Search
CPC ........................... G06F 9/547; G06F 17/30289
USPC .................................. 707/784, 790; 719/328
See application file for complete search history.

(56) References Cited

U.S. PATENT DOCUMENTS

| | | | |
|---|---|---|---|
| 5,555,404 A | 9/1996 | Torbjørnsen et al. | |
| 6,018,746 A | 1/2000 | Hill et al. | |
| 6,205,465 B1 | 3/2001 | Schoening et al. | |
| 6,542,907 B1 | 4/2003 | Cohen | |
| 6,560,639 B1 | 5/2003 | Dan et al. | |
| 6,671,821 B1 | 12/2003 | Castro et al. | |
| 6,675,299 B2 | 1/2004 | Porter et al. | |
| 6,961,768 B2 | 11/2005 | Davis et al. | |
| 6,981,135 B1 | 12/2005 | Trask | |
| 6,988,139 B1 * | 1/2006 | Jervis et al. | 709/226 |
| 7,062,559 B2 | 6/2006 | Yoshimura et al. | |
| 7,124,289 B1 * | 10/2006 | Suorsa | 713/1 |
| 7,133,907 B2 | 11/2006 | Carlson et al. | |
| 7,315,826 B1 | 1/2008 | Guheen et al. | |

(Continued)

OTHER PUBLICATIONS

International Search Report in PCT/US2010/029476, mailed May 25, 2010.*

(Continued)

*Primary Examiner* — Rehana Perveen
*Assistant Examiner* — Scott A Waldron
(74) *Attorney, Agent, or Firm* — Novak Druce Connolly Bove + Quigg LLP

(57) ABSTRACT

Aspects of a data environment, such as the creation, provisioning, and management of data stores and instances, are managed using a separate control environment. A user can call into an externally-facing interface of the control environment, the call being analyzed to determine actions to be performed in the data environment. A monitoring component of the control plane also can periodically communicate with the data environment to determine any necessary actions to be performed, such as to recover from faults or events in the data environment. A workflow can be instantiated that includes tasks necessary to perform the action. For each task, state information can be passed to a component in the data environment operable to perform the task, until all tasks for an action are completed. Data in the data environment can be accessed directly using an externally-facing interface of the data environment, without accessing the control plane.

28 Claims, 6 Drawing Sheets

(56) References Cited

U.S. PATENT DOCUMENTS

| | | | |
|---|---|---|---|
| 7,418,484 B2 | 8/2008 | Presley | |
| 7,478,263 B1 | 1/2009 | Kownacki et al. | |
| 7,502,329 B2 | 3/2009 | Li et al. | |
| 7,506,021 B2 | 3/2009 | Polan et al. | |
| 7,536,686 B2 | 5/2009 | Tan et al. | |
| 7,624,133 B1 | 11/2009 | Ojalvo | |
| 7,680,771 B2* | 3/2010 | Cialini et al. | 707/999.003 |
| 7,769,721 B2 | 8/2010 | Ueoka et al. | |
| 7,801,932 B2 | 9/2010 | Krishnaswamy | |
| 7,991,749 B2 | 8/2011 | Nishikawa et al. | |
| 8,020,037 B1 | 9/2011 | Schwartz et al. | |
| 8,041,679 B1 | 10/2011 | Narayanan | |
| 8,078,587 B2 | 12/2011 | Wahlert et al. | |
| 8,121,981 B2 | 2/2012 | Simek et al. | |
| 8,150,808 B2 | 4/2012 | Zha et al. | |
| 8,150,904 B2 | 4/2012 | Queck et al. | |
| 8,156,082 B2 | 4/2012 | Srivastava et al. | |
| 8,307,003 B1 | 11/2012 | Gangadhar et al. | |
| 2002/0019844 A1 | 2/2002 | Kurowski et al. | |
| 2002/0147709 A1 | 10/2002 | Rajarajan et al. | |
| 2003/0005091 A1 | 1/2003 | Ullmann et al. | |
| 2003/0212775 A1 | 11/2003 | Steele et al. | |
| 2003/0212898 A1 | 11/2003 | Steele et al. | |
| 2004/0073676 A1 | 4/2004 | Honma et al. | |
| 2004/0078637 A1 | 4/2004 | Fellin et al. | |
| 2004/0148443 A1 | 7/2004 | Achiwa | |
| 2004/0163008 A1 | 8/2004 | Kim | |
| 2004/0174823 A1 | 9/2004 | Steele et al. | |
| 2005/0004999 A1 | 1/2005 | Moore et al. | |
| 2005/0027845 A1 | 2/2005 | Secor et al. | |
| 2005/0038831 A1* | 2/2005 | Souder et al. | 707/201 |
| 2005/0193245 A1 | 9/2005 | Hayden et al. | |
| 2005/0210128 A1 | 9/2005 | Cannon et al. | |
| 2005/0216788 A1 | 9/2005 | Mani-Meitav et al. | |
| 2005/0243611 A1 | 11/2005 | Lubbers et al. | |
| 2005/0262164 A1 | 11/2005 | Guiheneuf et al. | |
| 2006/0041641 A1* | 2/2006 | Breiter et al. | 709/219 |
| 2006/0106675 A1 | 5/2006 | Cohen et al. | |
| 2006/0106774 A1 | 5/2006 | Cohen et al. | |
| 2007/0022122 A1 | 1/2007 | Bahar et al. | |
| 2007/0061266 A1 | 3/2007 | Moore et al. | |
| 2007/0061487 A1 | 3/2007 | Moore et al. | |
| 2007/0156842 A1 | 7/2007 | Vermeulen et al. | |
| 2007/0156872 A1* | 7/2007 | Stoyanova | 709/223 |
| 2007/0162420 A1* | 7/2007 | Ou et al. | 707/1 |
| 2007/0174691 A1 | 7/2007 | D'Souza et al. | |
| 2007/0234028 A1 | 10/2007 | Rothman et al. | |
| 2007/0244996 A1 | 10/2007 | Ahmed et al. | |
| 2007/0260693 A1 | 11/2007 | Cardone et al. | |
| 2007/0260696 A1 | 11/2007 | Bohannon et al. | |
| 2007/0271275 A1* | 11/2007 | Fassette et al. | 707/10 |
| 2007/0288526 A1 | 12/2007 | Mankad et al. | |
| 2007/0299828 A1 | 12/2007 | Lewis et al. | |
| 2008/0065650 A1 | 3/2008 | Kim et al. | |
| 2008/0109448 A1 | 5/2008 | Aboel-Nil et al. | |
| 2008/0134176 A1 | 6/2008 | Fitzgerald et al. | |
| 2008/0134178 A1 | 6/2008 | Fitzgerald et al. | |
| 2008/0162590 A1 | 7/2008 | Kundu et al. | |
| 2008/0183991 A1 | 7/2008 | Cosmadopoulos et al. | |
| 2008/0189413 A1 | 8/2008 | Srivastava et al. | |
| 2008/0195622 A1* | 8/2008 | Lelcuk et al. | 707/9 |
| 2008/0244579 A1* | 10/2008 | Muller | 718/100 |
| 2008/0256384 A1 | 10/2008 | Branson et al. | |
| 2008/0263388 A1 | 10/2008 | Allen et al. | |
| 2009/0006888 A1 | 1/2009 | Bernhard et al. | |
| 2009/0019535 A1 | 1/2009 | Mishra et al. | |
| 2009/0063563 A1 | 3/2009 | Khangaonkar et al. | |
| 2009/0106411 A1 | 4/2009 | Lisiecki et al. | |
| 2009/0106441 A1 | 4/2009 | Zuckerman et al. | |
| 2009/0164853 A1 | 6/2009 | Gokhale et al. | |
| 2009/0198940 A1 | 8/2009 | Ash et al. | |
| 2009/0216881 A1 | 8/2009 | Lovy et al. | |
| 2009/0271656 A1 | 10/2009 | Yokota et al. | |
| 2009/0328065 A1 | 12/2009 | Wookey | |
| 2010/0036851 A1 | 2/2010 | Paterson-Jones et al. | |
| 2010/0125555 A1 | 5/2010 | Lau et al. | |
| 2010/0169707 A1 | 7/2010 | Mathew et al. | |
| 2010/0191713 A1 | 7/2010 | Lomet et al. | |
| 2010/0250499 A1 | 9/2010 | McAllister et al. | |
| 2010/0250748 A1 | 9/2010 | Sivasubramanian et al. | |
| 2010/0251002 A1 | 9/2010 | Sivasubramanian et al. | |
| 2010/0251242 A1 | 9/2010 | Sivasubramanian et al. | |
| 2010/0251339 A1 | 9/2010 | McAllister | |
| 2011/0004457 A1 | 1/2011 | Haviv et al. | |
| 2011/0083138 A1 | 4/2011 | Sivasubramanian et al. | |
| 2011/0099146 A1 | 4/2011 | McAllister et al. | |
| 2011/0099147 A1 | 4/2011 | McAllister et al. | |
| 2011/0099420 A1 | 4/2011 | McAllister et al. | |

OTHER PUBLICATIONS

"Oracle9i SQL Reference", Oct. 2002, Oracle Corporation, pp. 1-1 to 1-3.*

Ralph Mietzner & Frank Leymann, "Towards Provisioning the Cloud: On the Usage of Multi-Granularity Flows and Services to Realize a Unified Provisioning Infrastructure for Saas Applications", 2008 IEEE Congress on Services—Part I, 2008, pp. 3-10.*

International Search Report mailed on May 25, 2010, for International Application No. PCT/US2010/029476 filed on Mar. 31, 2010, 2 pages.

U.S. Appl. No. 12/418,475, filed Mar. 4, 2009, Sheth.

International Search Report mailed on Dec. 2, 2010 for International Application No. PCT/US10/051757 filed on Oct. 7, 2010, 2 pages.

International Search Report mailed on Dec. 23, 2010 for International Application No. PCT/US10/54133 filed on Oct. 26, 2010, 2 pages.

International Search Report mailed on Dec. 21, 2010 for International Application No. PCT/US10/54139 filed on Oct. 26, 2010, 2 pages.

International Search Report mailed on Dec. 21, 2010 for International Application No. PCT/US10/54141 filed on Oct. 26, 2010.

James R. Cody, Practical Langauage-Independent Detection of Near-Miss Clones, ACM, 2004, 12 pages,<URL:http://delivery.acm.org/10.1145/104000/1034915/p1-cordy.pdf>.

Yi Wang, Virtual Routers on the Move: Live Router Migration as a Network-Management Primitive, ACM, 2008, 12 pages,<URL:http://delivery.acm.org/10.1145/1410000/1142512/p337-lomet.pdf>.

David Lomet, Recovery from "Bad" User Transactions, ACM, 2006, 10 pages, <URL:http://delivery.acm.org/10.1145/1150000/11142512/p337-lomet.pdf>.

Sanjay Ghemawat, The Google File System, ACM, 2003, 15 pages, <URL:http://delivery.acm.org/10.1145/1150000/1142512/p337-lomet.pdf>.

Brett Battles, Reducing Data Center Power Consumption Through Efficient Storage, Google Scholar, 2007, 9 Pages, <URL:http://www.it-executive.nl/images/downloads/reducing-datacert-power.pdf>.

Tirthankar Lahiri, Cache Fusion: Extending Shared-Disk Clusters with Shared Caches, Google Scholar, 2001, 4 pages, <URL:http://www.vldb.org/conf/2001/P683.pdf>.

"Examination Report dated Oct. 29, 2012", Singapore Application No. 201202868-4, Oct. 29, 2012, 5 pages.

"Examination Report dated Oct. 31, 2012", Singaporean Application No. 201202502-9, Oct. 31, 2012, 8 pages.

"Examination Report dated Oct. 9, 2012", Singapore Application No. 201107040-6, Oct. 9, 2012, 5 pages.

"Examination Report dated May 17, 2013", Singaporean Application No. 201202967-4, May 17, 2013, 10 pages.

"Examination Report dated Sep. 13, 2013", Singaporean Application No. 201202868-4, Sep. 13, 2013, 5 pages.

"Examination Report dated Sep. 21, 2012", Singaporean Application No. 201202870-0, Sep. 21, 2012, 8 pages.

"Final Office Action dated Oct. 16, 2012", U.S. Appl. No. 12/575,381, Oct. 16, 2012, 42 pages.

"Final Office Action dated Oct. 19, 2011", U.S. Appl. No. 12/418,475, Oct. 19, 2011, 26 pages.

"Final Office Action dated Nov. 1, 2012", U.S. Appl. No. 12/606,106, Nov. 1, 2012, 29 pages.

(56) References Cited

OTHER PUBLICATIONS

"Invitation to Respond to Written Opinion dated Sep. 14, 2012", Singaporean Application No. 201202967-4, Sep. 14, 2012, 14 pages.
"Non Final Office Action dated Mar. 14, 2012", U.S. Appl. No. 12/606,093, Mar. 14, 2012, 24 pages.
"Non Final Office Action dated Apr. 18, 2012", U.S. Appl. No. 12/575,381, Apr. 18, 2012, 31 pages.
"Non Final Office Action dated Apr. 29, 2011", U.S. Appl. No. 12/415,968, Apr. 29, 2011, 30 pages.
"Non Final Office Action dated May 2, 2011", U.S. Appl. No. 12/418,475, May 2, 2011, 20 pages.
"Non Final Office Action dated May 31, 2012", U.S. Appl. No. 12/606,106, May 31, 2012, 29 pages.
"Non Final Office Action dated Sep. 14, 2012", U.S. Appl. No. 13/299,601, Sep. 14, 2012, 15 pages.
"Notice of Allowance dated Oct. 24, 2012", U.S. Appl. No. 12/606,093, Oct. 24, 2012, 13 pages.
"Notice of Allowance dated Mar. 16, 2012", U.S. Appl. No. 12/418,475, Mar. 16, 2012, 11 pages.
"Notice of Allowance dated Jun. 26, 2012", U.S. Appl. No. 12/606,093, Jun. 26, 2012, 8 pages.
"Notice of Allowance dated Jun. 28, 2012", U.S. Appl. No. 12/418,475, Jun. 28, 2012, 20 pages.
"Singaporean Examination Report dated Oct. 30, 2012", Singaporean Application No. 201107040-6, Oct. 30, 2012, 5 pages.
"Singaporean Written Opinion dated Feb. 15, 2012", Singaporean Application No. 201107040-6, Feb. 15, 2012, 6 pages.
"Written Opinion dated Feb. 15, 2012", Singapore Application No. 201107040-6, Feb. 15, 2012, 6 pages.
Final Office Action, "Final Office Action dated Dec. 19, 2011", U.S. Appl. No. 12/415,968, Dec. 19, 2011.
Final Office Action, "Final Office Action dated Feb. 22, 2013", U.S. Appl. No. 13/294,099, Feb. 22, 2013.
Final Office Action, "Final Office Action dated Mar. 22, 2011", U.S. Appl. No. 12/415,998, Mar. 22, 2011.
Final Office Action, "Final Office Action dated May 8, 2013", U.S. Appl. No. 12/416,017, May 8, 2013.
Mietzner, Ralph et al., "Towards Provisioning the Cloud: On the Usage of Multi-Granularity Flows and Services to Realize a Unified Provisioning Infrastructure for SaaS Applications", 2008 IEEE Congress on Services, Part 1, 2008, 3-10.
Notice of Allowance, "Notice of Allowance Jul. 12, 2011", U.S. Appl. No. 12/606,097, Jul. 12, 2011.
Notice of Allowance, "Notice of Allowance dated Nov. 13, 2012", U.S. Appl. No. 12/415,968, Nov. 13, 2012.
Notice of Allowance, "Notice of Allowance dated Apr. 15, 2011", U.S. Appl. No. 12/415,987, Apr. 15, 2011.
Notice of Allowance, "Notice of Allowance dated Apr. 18, 2013", U.S. Appl. No. 13/620,962, Apr. 18, 2013.
Notice of Allowance, "Notice of Allowance dated Jun. 1, 2012", U.S. Appl. No. 12/415,968, Jun. 1, 2012.
Notice of Allowance, "Notice of Allowance dated Jul. 9, 2013", JP Application 2012-533307, Jul. 9, 2013.
Notice of Allowance, "Notice of Allowance dated Aug. 12, 2013", U.S. Appl. No. 13/299,601, Aug. 12, 2013.
Notice of Allowance, "Notice of Allowance dated Aug. 26, 2013", U.S. Appl. No. 13/620,962, Aug. 26, 2013.
Notice of Allowance, "Notice of Allowance dated Aug. 8, 2011", U.S. Appl. No. 12/415,987, Aug. 8, 2011.
Office Action, "Non Final Office Action dated Jan. 2, 2013", U.S. Appl. No. 13/620,962, Jan. 2, 2013.
Office Action, "Non Final Office Action dated Oct. 14, 2010", U.S. Appl. No. 12/415,998, Oct. 14, 2010.
Office Action, "Non Final Office Action dated Dec. 14, 2010", U.S. Appl. No. 12/415,987, Dec. 14, 2010.
Office Action, "Non Final Office Action dated Feb. 14, 2011", U.S. Appl. No. 12/606,097, Feb. 14, 2011.
Office Action, "Non Final Office Action dated Mar. 18, 2013", U.S. Appl. No. 13/299,601, Mar. 18, 2013.
Office Action, "Non Final Office Action dated May 28, 2013", U.S. Appl. No. 12/606,106, May 28, 2013.
Office Action, "Non Final Office Action dated Jun. 20, 2013", U.S. Appl. No. 13/620,999, Jun. 20, 2013.
Office Action, "Non Final Office Action dated Jul. 23, 2013", JP 2012-536966, Jul. 23, 2013.
Office Action, "Non Final Office Action dated Jul. 23, 2013", JP Application 2012-536964, Jul. 23, 2013.
Office Action, "Non Final Office Action dated Aug. 19, 2011", U.S. Appl. No. 12/416,017, Aug. 19, 2011.
Office Action, "Non Final Office Action dated Sep. 13, 2012", U.S. Appl. No. 13/294,099, Sep. 13, 2012.

* cited by examiner

CONTROL SERVICE FOR RELATIONAL DATA MANAGEMENT

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

Various services have been developed that enable a customer to adjust the compute capacity for an application or service in the cloud over time, making Web-scale computing easier for developers. In some cases, a Web service interface is provided that enables a customer to manage computing capacity, such as to obtain or boot new server instances in order to quickly scale capacity, both up and down, as computing requirements change.

The adjusting of capacity can be advantageous for applications available across a network or from a remote location. Oftentimes, these applications will rely on, or take advantage of, at least one data store or other such repository hosting data that is used by the respective application. While the processing capacity for the applications or services can be adjusted dynamically through these Web service interfaces, the data repositories upon which these applications rely are not similarly adjustable. Typically, performing tasks such as provisioning and scaling data storage are tedious manual procedures, in which a customer has to provide a database administrator (DBA) or similar expert user with configuration information and requirements, such that the DBA can determine whether the configuration is valid. The DBA typically then has to enable, tune, and optimize the data repository. There is no easy way for a customer to dynamically adjust the data storage capacity, or manage other such aspects of a data repository.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing aspects of data storage in an electronic environment. In particular, various embodiments provide a separate control environment, or control plane, that can be used to control aspects of a data environment, or data plane. The functionality of a control plane can be provided as a set of Web services, enabling the control plane to act as a virtual database administrator (DBA). A user or customer can submit a request to the control plane through an externally-visible application programming interface (API), for example, which can be analyzed to determine actions to be performed in the data plane, such as actions that create, delete, modify, expand, or otherwise modify a data store or data storage instance. A monitoring component of the control plane also can be provided that can monitor the health or status of components in the data plane, and can automatically determine actions to be taken in the data plane. State information can be passed to a component of the data plane for each task necessary to perform the action, such that the control plane can manage the performance of the tasks without having direct access into the data stores or other such components of the data plane. Once provisioned, a user can native access to the data instance(s) in the data plane, and can simply point existing applications (such as MySQL applications) to the DNS (domain name system) address or other location information for the particular instance. There is no restriction or modification of query models or other such functionality, as a user can continue to use applications built on MySQL, Oracle, or other such database technology.

Figure 1:
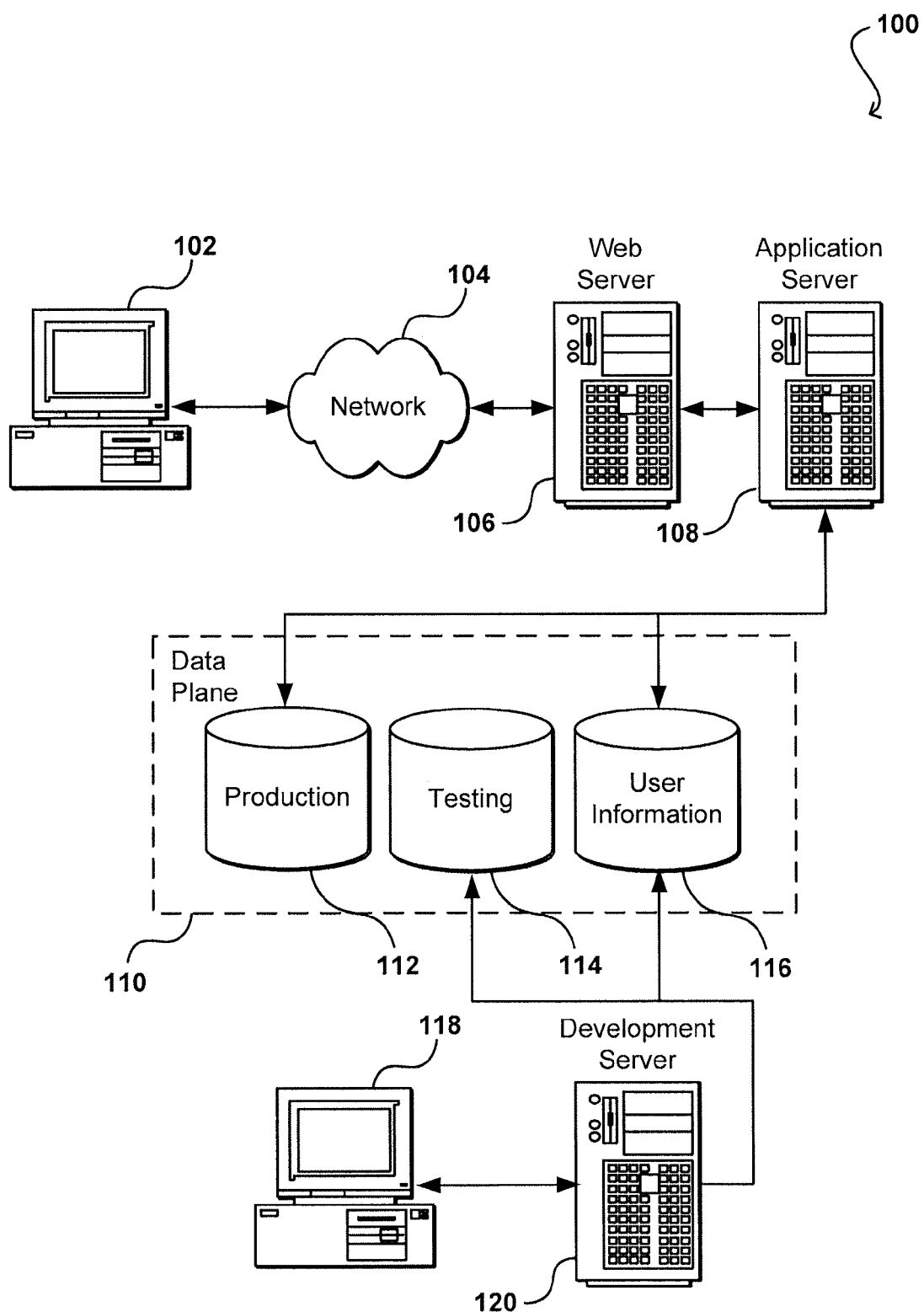
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for a provider such as an electronic marketplace, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2, discussed in detail below.

Systems and methods in accordance with one embodiment provide a relational database service ("RDS") that enables developers, customers, or other authorized users to easily and cost-effectively obtain and configure relational databases so that users can perform tasks such as storing, processing, and querying relational data sets in a cloud. While this example is discussed with respect to the Internet, Web services, and Internet-based technology, it should be understood that aspects of the various embodiments can be used with any appropriate services available or offered over a network in an electronic environment. Further, while the service is referred to herein as a "relational database service," it should be understood that such a service can be used with any appropriate type of data repository or data storage in an electronic environment. An RDS in this example includes at least one Web service that enables users or customers to easily manage relational data sets without worrying about the administrative complexities of deployment, upgrades, patch management, backups, replication, failover, capacity management, scaling, and other such aspects of data management. Developers are thus freed to develop sophisticated cloud applications without worrying about the complexities of managing the database infrastructure.

An RDS in one embodiment provides a separate "control plane" that includes components (e.g., hardware and software) useful for managing aspects of the data storage. In one embodiment, a set of data management application programming interfaces (APIs) or other such interfaces are provided that allow a user or customer to make calls into the RDS to perform certain tasks relating to the data storage. The user still can use the direct interfaces or APIs to communicate with the data repositories, however, and can use the RDS-specific APIs of the control plane only when necessary to manage the data storage or perform a similar task.

Figure 2:
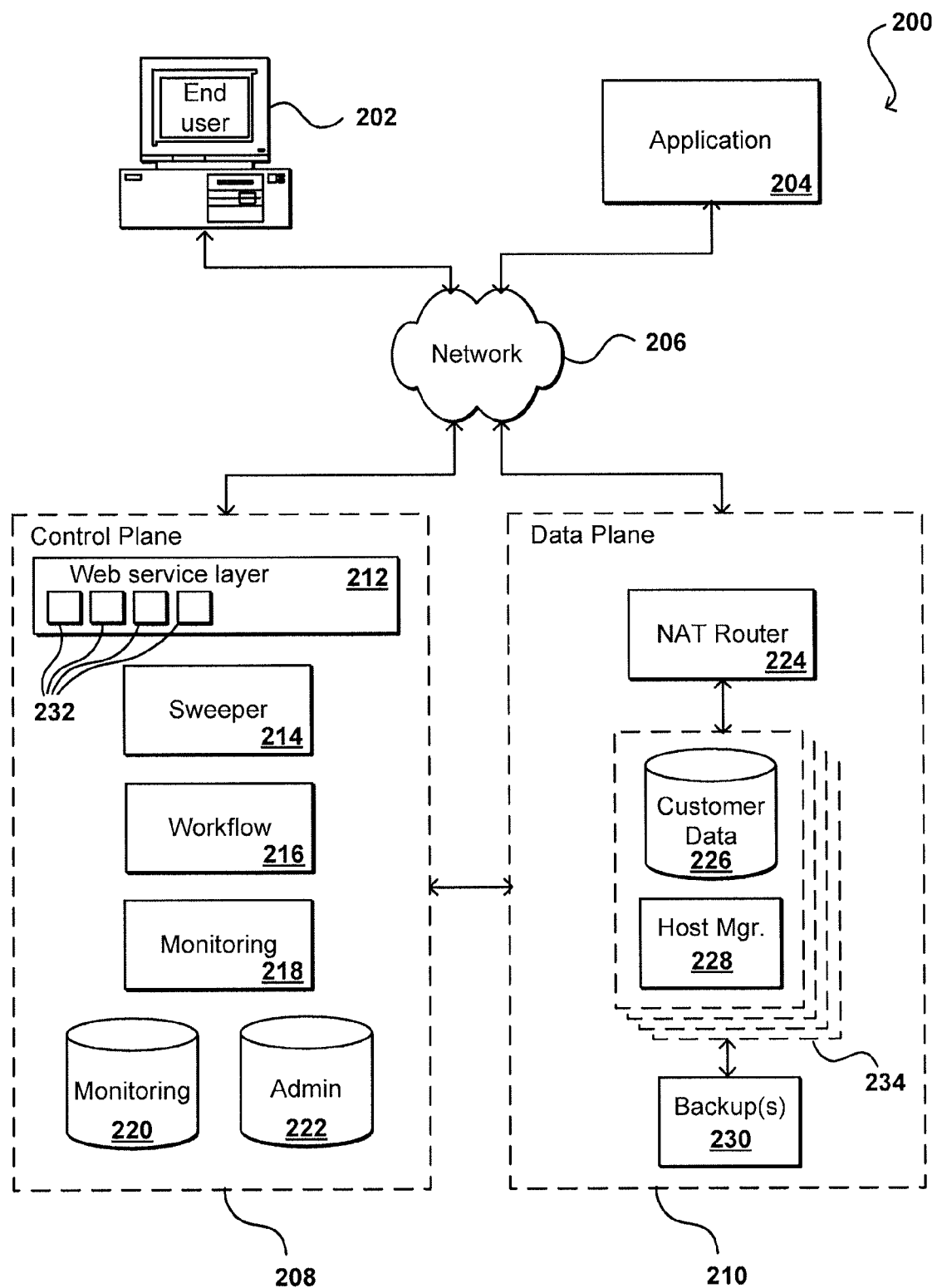
FIG. 2 illustrates an example separation of a control plane and a data plane that can be used in accordance with various embodiments.

FIG. 2 illustrates an example of an RDS implementation 200 that can be used in accordance with one embodiment. In this example, a computing device 202 for an end user is shown to be able to make calls through a network 206 into a control plane 208 to perform a task such as to provision a data repository of the data plane 210. The user or an application 204 can access the provisioned repository directly through an interface of a data plane 210. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation of at least some resources (e.g., hardware and/or software) used to provide the respective functionality.

The control plane 208 in this example is essentially a virtual layer of hardware and software components that handles control and management actions, such as provisioning, scaling, replication, etc. The control plane in this embodiment includes a Web services layer 212, or tier, which can include at least one Web server, for example, along with computer-executable software, application servers, or other such components. The Web services layer also can include a set of APIs 232 (or other such interfaces) for receiving Web services calls or requests from across the network 206, which the Web services layer can parse or otherwise analyze to determine the steps or actions needed to act on or process the call. For example, a Web service call might be received that includes a request to create a data repository. In this example, the Web services layer can parse the request to determine the type of data repository to be created, the storage volume requested, the type of hardware requested (if any), or other such aspects. Information for the request can be written to an administration ("Admin") data store 222, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

The control plane in this embodiment includes what is referred to herein as a "sweeper" component 214. A sweeper component can be any appropriate component operable to poll various components of the control plane or otherwise determine any tasks to be executed in response to an outstanding request. In this example, the Web services layer might place instructions or information for the "create database" request in the admin data store 222, or a similar job queue, and the sweeper can periodically check the admin data store for outstanding jobs. Various other approaches can be used as would be apparent to one of ordinary skill in the art, such as the Web services layer sending a notification to a sweeper that a job exists. The sweeper component can pick up the "create database" request, and using information for the request can send a request, call, or other such command to a workflow component 216 operable to instantiate at least one workflow for the request. The workflow in one embodiment is generated and maintained using a workflow service as is discussed elsewhere herein. A workflow in general is a sequence of tasks that should be executed to perform a specific job. The workflow is not the actual work, but an abstraction of the work that controls the flow of information and execution of the work. A workflow also can be thought of as a state machine, which can manage and return the state of a process at any time during execution. A workflow component (or system of components) in one embodiment is operable to manage and/or perform the hosting and executing of workflows for tasks such as: repository creation, modification, and deletion; recovery and backup; security group creation, deletion, and modification; user credentials management; and key rotation and credential management. Such workflows can be implemented on top of a workflow service, as discussed elsewhere herein. The workflow component also can manage differences between workflow steps used for different database engines, such as MySQL, as the underlying workflow service does not necessarily change.

In this example, a workflow can be instantiated using a workflow template for creating a database and applying information extracted from the original request. For example, if the request is for a MySQL® Relational Database Management System (RDBMS) instance, as opposed to an Oracle® RDBMS or other such instance, then a specific task will be added to the workflow that is directed toward MySQL instances. The workflow component also can select specific tasks related to the amount of storage requested, any specific hardware requirements, or other such tasks. These tasks can be added to the workflow in an order of execution useful for the overall job. While some tasks can be performed in parallel, other tasks rely on previous tasks to be completed first. The workflow component or service can include this information in the workflow, and the tasks can be executed and information passed as needed.

An example "create database" workflow for a customer might includes tasks such as provisioning a data store instance, allocating a volume of off-instance persistent storage, attaching the persistent storage volume to the data store instance, then allocating and attaching a DNS address or other address, port, interface, or identifier which the customer can use to access or otherwise connect to the data instance. In this example, a user is provided with the DNS address and a port address to be used to access the instance. The workflow also can include tasks to download and install any binaries or other information used for the specific data storage technology (e.g., MySQL). The workflow component can manage the execution of these and any related tasks, or any other appropriate combination of such tasks, and can generate a response to the request indicating the creation of a "database" in response to the "create database" request, which actually corresponds to a data store instance in the data plane 210, and provide the DNS address to be used to access the instance. A user then can access the data store instance directly using the DNS address and port, without having to access or go through the control plane 208. Various other workflow templates can be used to perform similar jobs, such as deleting, creating, or modifying one of more data store instances, such as to increase storage. In some embodiments, the workflow information is written to storage, and at least one separate execution component (not shown) pulls or otherwise accesses or receives tasks to be executed based upon the workflow information. For example, there might be a dedicated provisioning component that executes provisioning tasks, and this component might not be called by the workflow component, but can monitor a task queue or can receive information for a provisioning task in any of a number of related ways as should be apparent.

As mentioned, various embodiments can take advantage of a workflow service that can receive requests or calls for a current state of a process or task, such as the provisioning of a repository, and can return the current state of the process. The workflow component and/or workflow service do not make the actual calls or requests to perform each task, but instead manage the state and configuration information for the workflow that enables the components of the control plane to determine the next task to be performed, and any information needed for that task, then generate the appropriate call(s) into the data plane including that state information, whereby a component of the data plane can make the call to perform the task. Workflows and tasks can be scheduled in parallel in order to increase throughput and maximize processing resources. As discussed, the actual performing of the tasks will occur in the data plane, but the tasks will originate from the control plane. For example, the workflow component can communicate with a host manager, which can make calls into the data store. Thus, for a given task a call could be made to the workflow service passing certain parameters, whereby the workflow service generates the sequence of tasks for the workflow and provides the current state, such that a task for the present state can be performed. After the task is performed (or otherwise resolved or concluded), a component such as the host manager can reply to the service, which can then provide information about the next state in the workflow, such that the next task can be performed. Each time one of the tasks for the workflow is performed, the service can provide a new task to be performed until the workflow is completed. Further, multiple threads can be running in parallel for different workflows to accelerate the processing of the workflow.

The control plane 208 in this embodiment also includes at least one monitoring component 218. When a data instance is created in the data plane, information for the instance can be written to a data store in the control plane, such as a monitoring data store 220. It should be understood that the monitoring data store can be a separate data store, or can be a portion of another data store such as a distinct set of tables in an Admin data store 222, or other appropriate repository. A monitoring component can access the information in the monitoring data store to determine active instances 234 in the data plane 210. A monitoring component also can perform other tasks, such as collecting log and/or event information from multiple components of the control plane and/or data plane, such as the Web service layer, workflow component, sweeper component, and various host managers. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each instance 234 in the data plane can include at least one data store 226 and a host manager component 228 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager also perform and/or mange the installation of software patches and upgrades for the data store and/or operating system. A host manger also can collect relevant metrics, such as may relate to CPU, memory, and I/O usage.

The monitoring component can communicate periodically with each host manager 228 for monitored instances 234, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. If a response is not received after a specified number of retries, then the monitoring component can determine that there is a problem and can store information in the Admin data store 222 or another such job queue to perform an action for the instance, such as to verify the problem and re-provision the instance if necessary. The sweeper can access this information and kick off a recovery workflow for the instance to attempt to automatically recover from the failure. The host manager 228 can act as a proxy for the monitoring and other components of the control plane, performing tasks for the instances on behalf of the control plane components. Occasionally, a problem will occur with one of the instances, such as the corresponding host, instance, or volume crashing, rebooting, restarting, etc., which cannot be solved automatically. In one embodiment, there is a logging component (not shown) that can log these and other customer visibility events. The logging component can include an API or other such interface such that if an instance is unavailable for a period of time, a customer can call an appropriate "events" or similar API to get the information regarding the event. In some cases, a request may be left pending when an instance fails. Since the control plane in this embodiment is separate from the data plane, the control plane never receives the data request and thus cannot queue the request for subsequent submission (although in some embodiments this information could be forwarded to the control plane). Thus, the control plane in this embodiment provides information to the user regarding the failure so the user can handle the request as necessary.

As discussed, once an instance is provisioned and a user is provided with a DNS address or other address or location, the user can send requests "directly" to the data plane 210 through the network using a Java Database Connectivity (JDBC) or other such client to directly interact with that instance 234. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 202 or application 204, for example, can be directed to a network address translation (NAT) router 224, or other appropriate component, which can direct the request to the actual instance 234 or host corresponding to the DNS of the request. As discussed, such an approach allows for instances to be dynamically moved, updated, replicated, etc., without requiring the user or application to change the DNS or other address used to access the instance. As discussed, each instance 234 can include a host manager 228 and a data store 226, and can have at least one backup instance or copy in persistent storage 230. Using such an approach, once the instance has been configured through the control plane, a user, application, service, or component can interact with the instance directly through requests to the data plane, without having to access the control plane 232. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 208 can be offered as at least one service by a provider that may or may not be related to a provider of the data plane 210, but may simply be a third-party service that can be used to provision and manage data instances in the data plane, and can also monitor and ensure availability of those instances in a separate data plane 210.

As discussed, one advantage to providing the functionality of a control plane as a Web service or other such service is that the control plane functions as a virtual database administrator (DBA) and avoids the need for a human DBA to perform tasks such as provisioning data. Provisioning data is presently a tedious manual procedure, requiring a DBA to receive the necessary configuration information, determine whether the configuration is valid, optimize and tune the instance, and perform other such tasks, which take a significant amount of time and effort. Further, such an approach provides many opportunities for error, which might not be discovered until after data is lost. Using a control plane or service as described herein, a user or customer can instead submit a call including information such as a type of hardware and a version of a database product. The control plane or service can then perform the necessary tasks to create, delete, modify, expand, or otherwise modify a data store or data storage instance. The control plane also can support several different database engines in a consistent fashion, without requiring a DBA to be an expert in each of the engines. Once provisioned, the user has native access to the data instance(s), and can simply point existing applications (such as MySQL applications) to the DNS address or other location information for the particular instance. There is no restriction or modification of query models or other such functionality, as a user can continue to use applications built on MySQL, Oracle, or other database technology.

Figure 3:
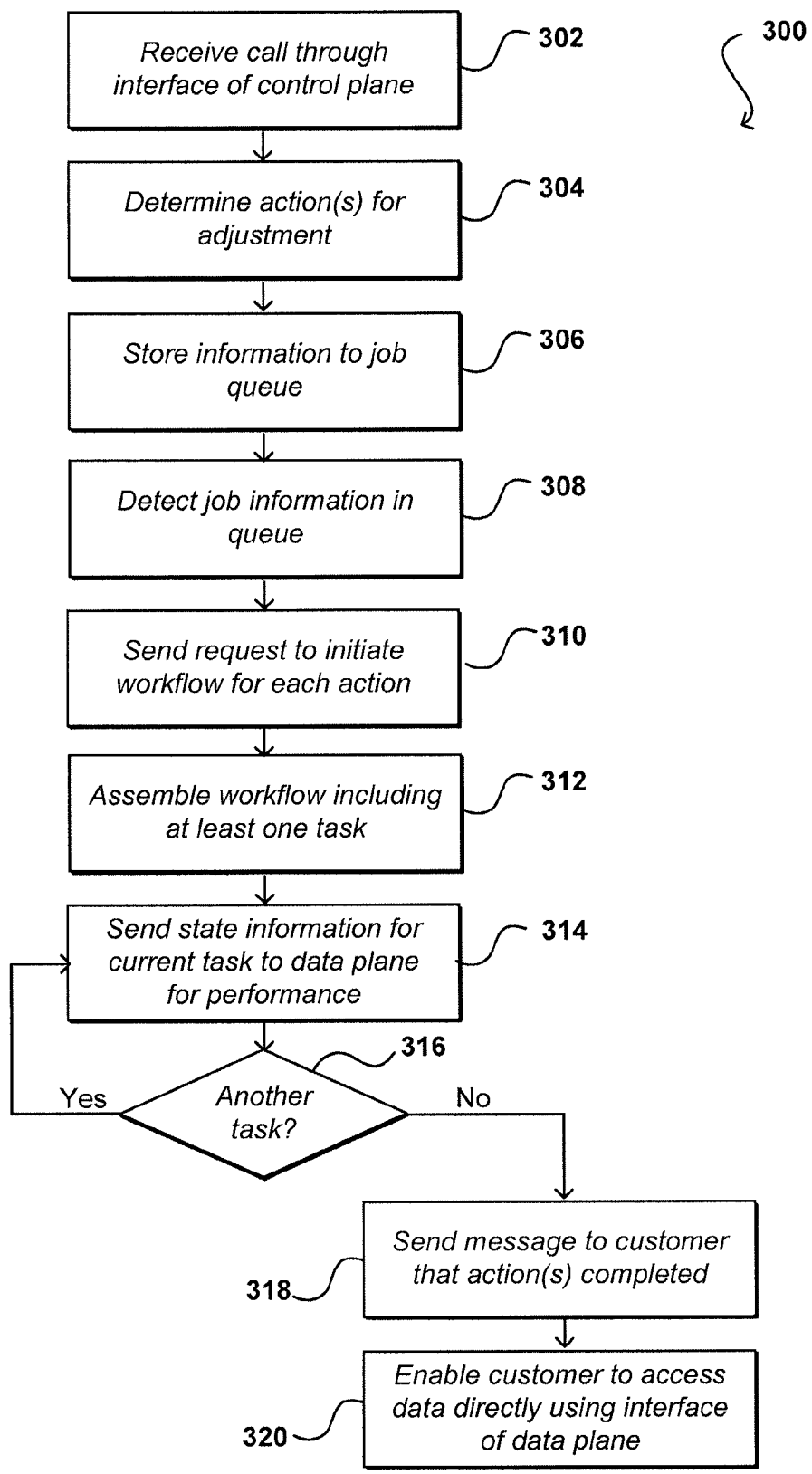
FIG. 3 illustrates an example process for requesting an action through the control plane to be performed in the data plane in accordance with one embodiment.

Using components such as those discussed above, FIG. 3 illustrates an example process 300 by which a customer can request the performance of a control-related task with respect to at least one data instance in a data environment, here the data plane, using the control plane or a similar data control service. While the term "customer" is used herein to refer to the "owner" of data, or a data store or instance hosted by the RDS system, it should be understood that the term customer is merely an example, and that any appropriate user or developer can be allowed to access the control plane and data plane in the various embodiments. A request, such as a Web services call, is received through a customer-facing control plane interface component 302. The request is analyzed to determine at least one action needed to process the request 304. As discussed, this can take the form of a component of a Web services layer parsing the request to determine the action(s) being requested. In this embodiment, information for the action, such as the type of action and parameters to be used to perform the action, is written to a job queue 306, such as may be located in an Admin data store or other such storage location. The job queue can be monitored, such as by a sweeper component, to determine the presence of job information 308 and, when job information is detected, a request can be sent to initiate a workflow for the requested action 310. This can include a request sent by the sweeper component to a workflow component and/or service to instantiate a workflow. In other embodiments, a workflow component might monitor the job queue for jobs, or a component of the Web services layer may send the job information directly to a workflow component.

Upon receiving the job information, the information is analyzed to determine and/or assemble an appropriate workflow for the requested action 312. As discussed, different tasks can be selected for the workflow based upon factors such as the type of action requested and the type of database engine being used. Beginning with the first task of the workflow, state information is sent to a host manager in the data environment operable to use the state information to determine a task to be performed, perform the task with respect to a data repository and/or data instance, and return a response upon completion of the task 314. Upon receiving the response, the workflow component determines whether there is another task to be performed 316. If so, state information for the next task is sent to the host manager, and upon completion of that task the host manager sends a response to the workflow component. After the final task has been completed, a message is sent to the requesting customer (or another appropriate user, application, or location) that the requested action has been completed 318. After the action has been performed, the customer is able to directly access the data instance upon which the action was performed using a data interface of the data environment, without accessing or passing through the control plane 320. As mentioned, the user can provided with a DNS address and port number, for example, such that if the action resulted in movement of data or another similar action, the customer or an application can continue to use the same DNS address, which will be directed to the appropriate location in the data plane.

Figure 4:
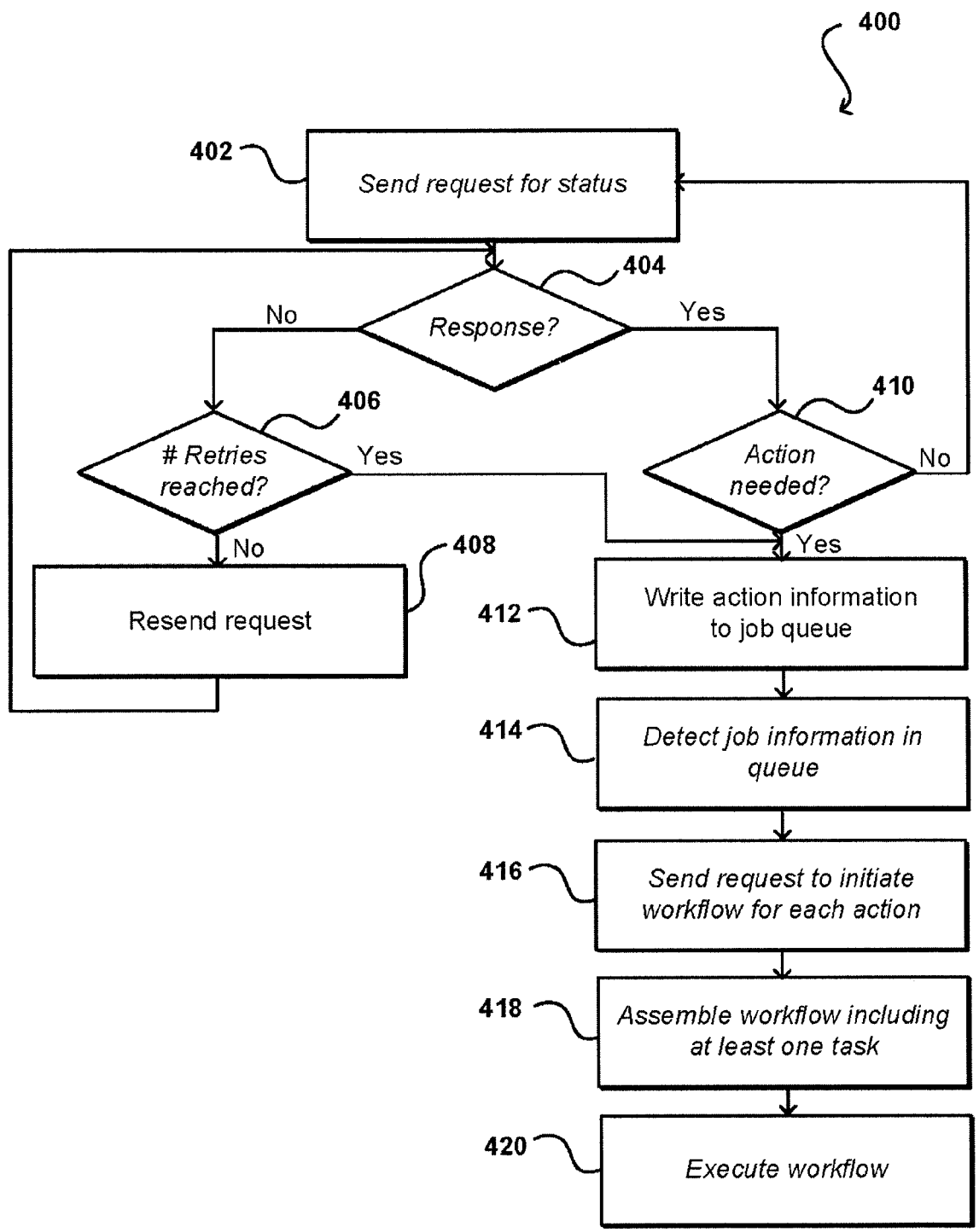
FIG. 4 illustrates an example process for monitoring and automatically performing actions in the data plane in accordance with one embodiment.

Similarly, FIG. 4 illustrates an example process 400 by which a control plane or control service can monitor the performance of a data instance (or data store, repository, etc.) in a data environment, here the data plane. A request for status is sent to a host manager component for a data instance 402.

A determination is made as to whether a response is received within a specified amount of time 404. If no response is received, it is determined whether a threshold number of requests have been sent 406. If a threshold number of requests have not been send, another request can be sent 408. If a response message is received, the response is analyzed to determine whether the message includes any errors or tasks to be addressed 410. If not, and the instance is determined to be healthy, the process can continue with another request for status being sent at a later time. If the response message indicates that an action needs to be performed with respect to the data instance, information for the action, such as the type of action and parameters to be used to perform the action, is written to a job queue 412, such as may be located in an Admin data store or other such storage location. The job queue can be monitored to determine the presence of job information 414, such as by a sweeper component, and when job information is detected, a request can be sent to initiate a workflow for the requested action 416. In other embodiments, a workflow component might monitor the job queue for jobs, or a component of the Web services layer may send the job information directly to a workflow component.

Upon receiving the job information, the information is analyzed to determine and/or assemble an appropriate workflow for the requested action 418. Beginning with the first task of the workflow, state information is sent to a host manager in the data environment to perform the task and execute the workflow 420, such as may be accomplished using a process described with respect to steps 314 to 316 of the process of FIG. 3. If the final task is completed successfully, the data instance can simply continue to process requests sent from customers or applications via a data plane interface. If any task cannot be completed successfully, a message can be sent to a customer (or another appropriate user, application, or location) indicating a potential problem with the data instance. Various other notification actions can occur, such as generating an action notification and/or adding information to an error log.

Specific Interface Examples

As discussed above, users of the control plane can perform various tasks relating to data repositories and data instances using a set of APIs or other such interfaces. While the selection and names of the example APIs are used for purposes of explanation, it should be apparent that other selections, combinations, names, and other aspects can vary between the various embodiments. As discussed in one of the examples above, customers can create a data store using a "CreateDatabase" or similar API. The user can call a Web service to specify any desired values for an instance type (which describes the CPU and memory capacity), storage size, repository name, port, and other such values. The customer could also utilize a "DescribeDatabase" or similar API to poll on the status of the repository to determine the state of the repository, such as whether the repository state is provisioned. When the status of database is "AVAILABLE," for example, the customer can retrieve an endpoint which is returned as part of a response to the DescribeDatabase call. Customers can delete a repository or instance using a "DeleteDatabase" or similar API. Customers also can have the ability to hibernate a repository or instance, placing an instance in a "sleep" state, for example, using a "HibernateDatabase" or similar API. During such a "sleep" state, the data typically will not be accessible but the data will be backed up durably. Customers can wake a hibernated data repository or instance using a "ResumeDatabase" or similar API.

As mentioned earlier, a control plane or service can handle the complexity of not just database provisioning, but also tasks such as upgrades, patch management, backups, and failover. A customer can control the times for backups and maintenance activities by enabling customers to specify (or modify) the backup window and maintenance window times while invoking a "CreateDatabase" (or "ModifyDatabase" or similar) API. Using a "ModifyDatabase" API, customers can increase the storage size, change the instance type, or modify various other fields.

Customers also can be provided with at least one "Database Access Control" or similar API. When a data repository is created, users can specify one or more existing security groups to restrict network access to the repository. Customers can authorize access to the repository by adding permission rules to the security group that is applied to the repository using an API such as an AuthorizeDBSecurityGroupIngress API. Customers can also add or remove security groups from a repository at any time using an API such as a "ModifyDatabase" API. Customers can create (or delete) security groups using similar APIs, such as a "CreateDBSecurityGroup" (or "DeleteDBSecurityGroups") API.

A control plane also can provide at least one "Database User Management" or similar API. As part of a CreateDatabase API, for example, customers in one embodiment can be expected to supply the username and password for a special repository user, such as may be called a "Repository Owner." A Repository Owner is a special type of user who owns the repository schema objects. After creation of a repository, a customer can perform tasks such as to add more users to using a "CreateDatabaseUser" API, remove users using a "DeleteDatabaseUser" API, and list customers using a "DescribeDatabaseUsers" API. Customers also can obtain the history of events (such as outages due to maintenance or backup related events) related to the repositories and instances using a "DescribeEvents" or similar API.

Customer Example

In this example a customer wants to provision a new data instance, instead of maintaining and managing an existing MySQL database. In this example, the existing CUSTOMER database is 60 GB, and storage growth estimates are around 10% per month. Based on these initial capacity requirements, the customer selects an instance to be provisioned with an initial capacity of 80 GB. The customer chooses a master user and master user password, and based on firewall requirements chooses an appropriate port number (e.g., 4030) on which the data instance will be listening.

Figure 5:
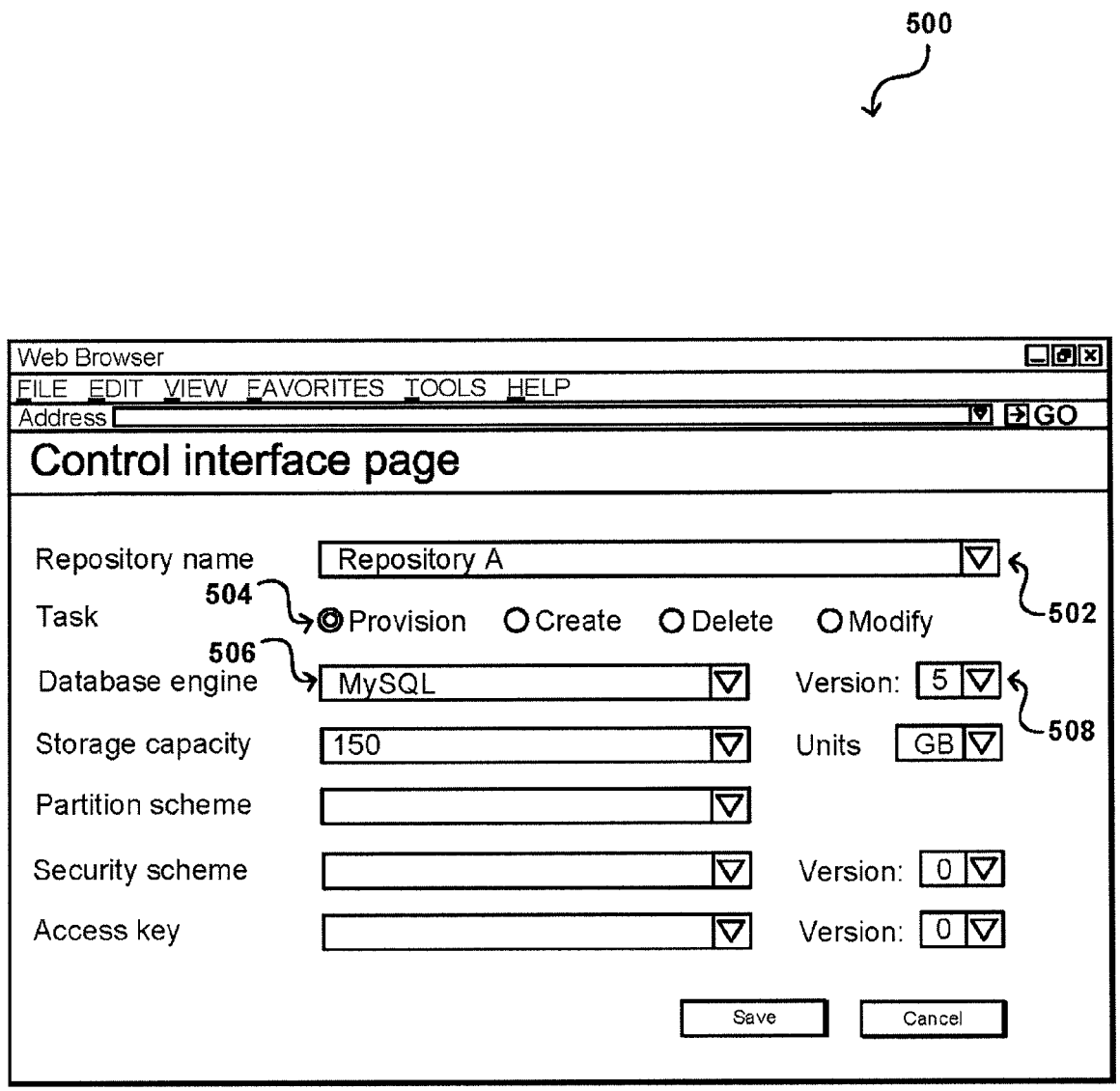
FIG. 5 illustrates example communication flow between hosts in a data plane and a workflow service in the control plane in accordance with one embodiment.

The customer, if not already signed up or subscribed to the control service, can sign up for the service. In some embodiments, the user will receive software or will access an interface page through the Internet, for example, that will allow a user to submit requests to the control plane or service. For example, FIG. 5 illustrates an example of a display 500, here a page rendered in a browser application, that can allow a user to make calls into the control plane. As illustrated, the interface can include options that allow the user to enter information needed to perform a control action on the data plane. For example, the interface page can include options to specify a repository for the action 502, select an action to be performed 504, and specify options for the action 506, such as a database engine to be use or capacity to be requested, as well as version information 508 or other such options. In other embodiments, a user can manually (or otherwise) create and submit Web service calls to the control plane. In the following example, the customer generates a request to create a new data repository using a command line tool. A request can take the form of, for example:

```
rds-create-database --identifier customerprod --dbname customer -
-size 80 -class small --engine mysql5.1 --master master_username
--password master_password --port 4030
```

The customer can have the ability to check on the provisioning status, and can request a connect string using the command line tool to describe the repository, such as by submitting:
  describe-repositories customerprod
The customer can grant access to the default security group, such as from the address range 205.192.0.0/16 by:
  authorize default -s 205.192.0.0/16
The customer also can check on the status of security changes, such as by submitting:
  describe-group default
Once the request has been submitted, the control plane can asynchronously execute the request to provision the repository. A "DescribeDatabases" or similar API can be used to determine the status of the request. While provisioning is still in progress, the status will show as "Pending Creation," for example, and can be changed to a state such as "Created" once the provisioning has been completed. At this point, the customer can have all the information necessary for connecting to the repository.

Once the repository has been provisioned and is available, the customer can perform various actions on the data plane. For example, the customer can populate the CUSTOMER repository, such as by using a MySQL dump utility or similar data transfer process. The customer in this example runs a command (i.e., on the source MySQL database server using a compatible client utility) such as the following:

```
$ mysqldump -opt customer | mysql--host end_point_hostname --port
4030 -C customer
```

The customer also can verify that the required tables are created, such as by submitting:

```
$ mysql -u master_username -h end_point_hostname --port 4030 -p
master_password
Mysql> show tables;
```

| Tables in customer |
| --- |
| Table1 |
| Table2 |
| Table3 |

The repository is ready for use by one of the customer's applications. The customer changes the connect string (or other pointer) for the application to point to new instance database instead of the original self-managed database.

In this example, the customer also wants to implement data security through role-based access control. Before turning on the provisioned and loaded data instance and making the instance available, the customer wants to implement role based access control such that a development team will have read/write access to the repository but business analysts will only obtain read access. The client also wants "master user" access limited to handful of senior members, so the remaining developers need a different database user role.

With respect to the control plane, the customer can submit a request to create the new database user using the command line tool, for example, such as by submitting the following:

```
create-user --identifier customerprod --username develop1 --
  password develop1
create-user --identifier customerprod --username analyst1--
  password analyst1
```

The customer can also check on provisioning status for the request, such as by submitting:
  describe-users customerprod
While provisioning is still in progress, the status can show a state such as "Pending Creation," and the status will be changed to a state such as "Created" once the provisioning has been completed. The customer can now perform necessary tasks for securing the users in the data plane.

The customer then can, with respect to the data plane, grant read/write privileges to a develop1 user for all tables owned by master-username, such as by submitting:

```
$ mysql-u master_username -h end_point_hostname --port 4030 -p
  master1
Mysql>grant select, insert, update, delete on master_username.*
  to 'develop1'@'%';
```

The customer can also grant read privileges to an analyst1 user for all tables owned by master_username:

```
$ mysql-u master_username -h end_point_hostname --port 4030 -p
  master1
Mysql>grant select on master_username.*to'analyst1'@'%';
```

After the instance has been running for a while, the customer may decide to scale up the size of the instance, such as to 150 GB of storage. The customer in this example thus can submit a request to modify the database capacity using the command line tool, such as by submitting:
  modify-database—identifier customerprod—size 150
If the system also allows to adjust the size of an instance for compute or processing needs, then that adjustment can be made in the same or a similar command by specifying an additional parameter value. The customer also can check on a provisioning status for the adjustment by submitting a command such as:
  describe-databases customerprod
The requested repository modifications in one embodiment take place during the maintenance window specified by the customer as discussed above. While the changes are in progress, the status be, for example, "Pending Modification," which can be changed to a value such as "Active" once the provisioning has been completed. As discussed, the customer does not have to take any actions on the data plane side during the execution of this request. On the control plane side, the customer can subscribe to a service such as an auto-scaling plan. Once subscribed, the customer does not have to take any action, even on the control plane, as the auto-scaling can be configured to manage capacity for the customer and scale up or down as needed.

At some point, the customer may wish to implement improved or updated processes for various development needs and may wish to set up a test instance of a particular data store. The customer may also want to take a snapshot of the production instance so that the test instance is fully populated and comparable with the production date. The customer decides that, for the particular needs of the testing procedure, the customer can utilize a SMALL instance for purposes of processing capacity, and can provision the same storage capacity as is used for production. The customer thus can submit a request to clone the database using a command line tool, such as by submitting:

```
create-database --identifier customertest --dbname tcustomer --
    size 150 --class small--engine mysql5.1--master master_username
    --password master_password--port 4030
```

The customer can also check on the provisioning status by submitting a command such as:
describe-databases customertest
The requested modifications can take place during the maintenance window previously specified by the customer. While the changes are in progress, the status will show as "Pending Modification," for example, and can be changed to a state such as "Active" once the provisioning has been completed. The customer does not have to take any actions on the data plane side during the execution of this request. On the control plane side, the customer can subscribe to a service such as auto-scaling, as mentioned previously, such that once subscribed the customer does not have to take any action even on the control plan as the auto-scaling service will manage the scaling for the customer.

As discussed previously, the use of a control plane or service in accordance with various embodiments does not restrict the type of SQL queries that a customer can run, and does not impose any restrictions relating to construction of a schema, such as to be partition ready and not allow queries spanning partitions. Instead, a repository such as a relational database can be provisioned in a computing "cloud" without restricting the users' schema or queries. As commonly known, even though there is a theoretical SQL standard, the SQL quirks, syntaxes and their behaviors (e.g., NULL handling) vary across different relational database engines (e.g., MySQL, Oracle, or Postgres). For at least these reasons, users may wish to choose a relational database engine that is familiar for purposes of programming and operations. Such an approach allows customers to use the same set of database tools that the customers have used previously for tasks such as data modeling, development, and debugging, even when the customers migrate their data stores to the cloud (or elsewhere) via the control plane. Using such an approach, customers are not required to rewrite their application or any operational tools, which lowers the barrier of entry significantly for customers to move data to the cloud.

A customer's data repositories can be moved to the cloud in one embodiment by running the repositories on compute nodes of a cloud computing environment. Block level storage volumes, such as off-instance storage volumes that persist independently from the life of an instance, can be used with these instances for storing the repository binary, logs and volumes, for example. Such an approach can be advantageous, as the virtualization provides flexibility to quickly and easily scale a compute and storage resources for a repository. Further, such an approach can provide for persistent storage in the cloud.

As known in the art, relational databases can be run in different modes, such as may include: stand-alone (non-replicated), replicated, or replicated and partitioned. A customer typically makes the choice of which mode to run for a repository based on the availability and scalability needs of the repository and the incurred total cost of ownership (TCO). Some applications and services to not require a repository to be highly available and durable, and may instead utilize a stand-alone repository that is able to tolerate outages on the order of minutes. Other applications and servers can require a repository to be always available, and require the repository to never lose data even in the event of a failure. In this case, the applications and services typically require a replicated database offering. Some users, applications, or services require a massively scalable repository that can partition data across multiple repositories, such that scaling can occur beyond the compute and storage capacity of a single database. To address these different use cases, an approach in accordance with one embodiment offers at least two modes, such as stand-alone and high availability, for each database engine. Some embodiments also allow customers build their own partitioning layer on top of either stand-alone or high availability repositories.

As mentioned, the control plane layer can take advantage, or "sit on top," of various basic software frameworks for performing tasks such as: implementing workflows, establishing secure communication channels between the host managers of the data plane and the components of the control plane, installing software on the instances of the data plane, and performing various database backup and recovery procedures.

For example, a control plane layer can take advantage of a workflow service to manage workflows. As commonly known, a key characteristic of any workflow engine is that the engine enables asynchronous and resumable processing. As discussed above, a workflow can be thought of as a state machine that starts with an initial state and goes through a series of intermediate state transitions by executing different steps of the workflow before reaching the end goal. This end goal can be thought of as the terminal state of a state machine. A workflow service offers the ability to create workflows, and provides hooks to determine the current state of a given workflow and the step(s) to next be executed. The service can store the current state of the state machine, keeping track of the steps which executed successfully and the steps that must be executed to keep the workflow moving. The service does not, in general, actually execute the state transitions for us. The precise tasks of executing the tasks for a workflow will in many embodiments be performed by the "client" components of the workflow.

Figure 6:
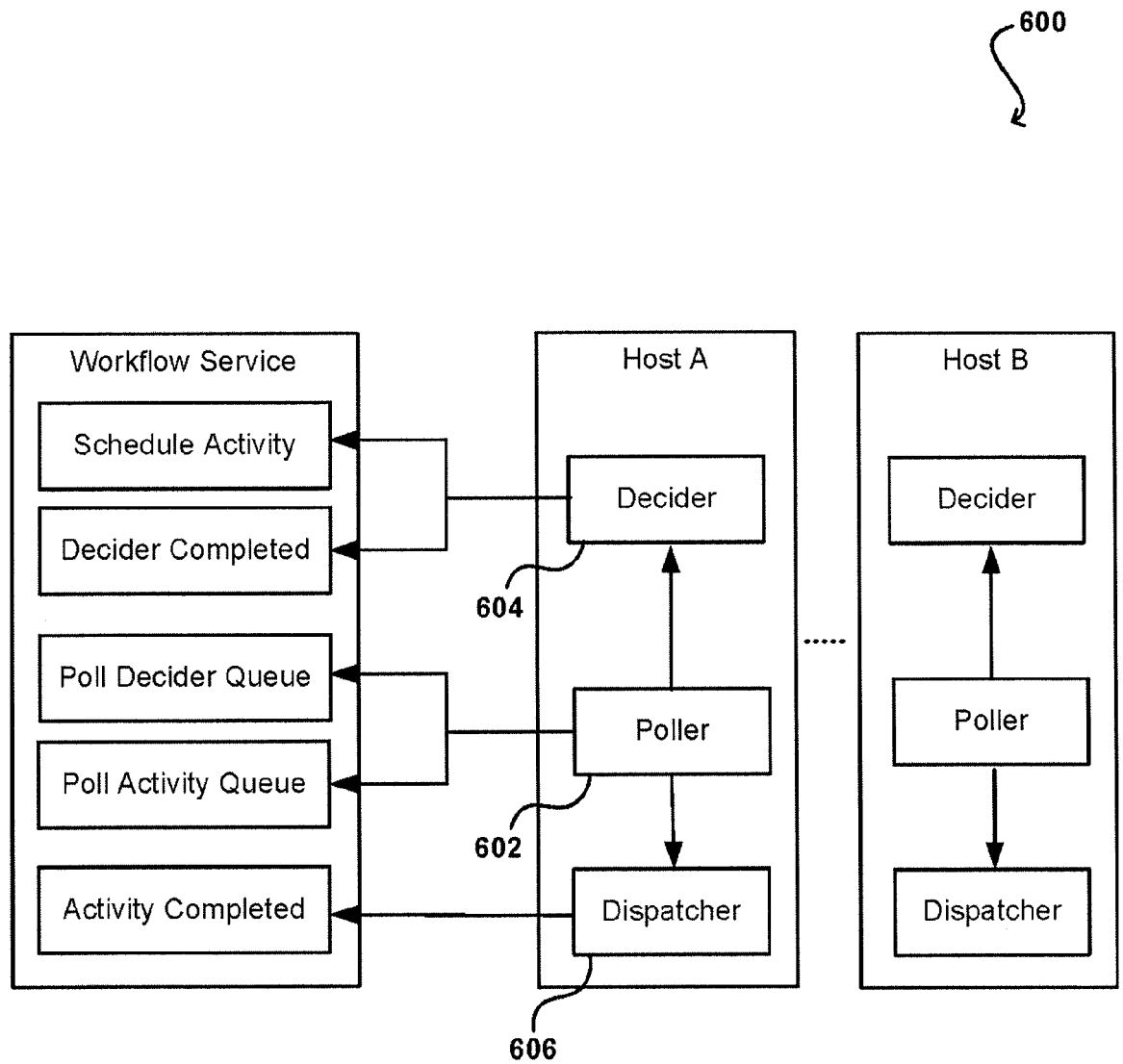
FIG. 6 illustrates an example of a display for generating a request for action in the data plane to be submitted to a user interface of the control plane in accordance with one embodiment.

Since a control plane can have multiple workflows running in parallel at any given time, and these workflows can be for performing different tasks, the control plane can take advantage of an architecture that is able to schedule multiple workflows and execute multiple activities in parallel. In one embodiment, the control plane includes various worker fleets that are programmed to execute the various workflow tasks. The interaction between these worker fleets and the workflow service will be described with respect to the configuration 600 of FIG. 6. Each worker host runs three components in this example, a poller component 604, a decider component 602, and a dispatcher component 606. Each host runs a single poller thread, which polls the decider queue for each workflow type. The decider queues are polled in one embodiment based on the priority order of different workflow types. For instance, the decider queues can be polled for a recovery workflow ahead of a repository creation workflow. If, for example, a pollDeciderQueue API returns a non-empty list of decisions, the poller can forward the decisions to the decider component. The decider component then can make a decision regarding the next task to execute in a given workflow, and can call a "startActivity" or similar API to add the task to the activity queue for a given workflow. During the polling, the poller can move to the next task when the decider queue returns empty results, and can poll the activity queue using a "PollActivityQueue" or similar API. If the pollActivityQueue API returns a non-empty list, this list can be handed over to a dispatcher threadpool, which can be tasked with executing the workflow activity. Upon successful completion of the workflow activity, an "ActivityCompleted" or similar API can be called, which will call the workflow service to enqueue in the decision queue.

Each workflow host in the workflow fleet runs a poller threader, decider, and dispatcher threadpool in this example. The workflows can be defined in one embodiment using an annotations framework, and a workflow application can build these definitions at startup by reading from the appropriate classpath. The workflow service host first registers the list of registered workflows and activity types using APIs of the workflow service such as a "registerWorkflowType" and "registerActivityType" API. Since these APIs are idempotent in this example, each API can be called multiple times from multiple fleets.

New workflow instances of different workflow types may need to be created for tasks such as repository creation, repository deletion, repository modification, repository recovery, repository backups, user creation, user deletion, password reset, security management, and other such tasks. Each of these workflow instances can be created using a sweeper that constantly sweeps the Admin repository for any changes to be executed, as discussed above with respect to FIG. 2. For instance, if a user wants to create a new repository then the Web service layer can store the required configuration in Admin DB with a status column such as "PENDING_CHANGES." Each workflow host can runs a sweeper thread that sweeps for any database or security group records with status set to PENDING_CHANGES, and can start a workflow accordingly.

While in some embodiments the workflow service's "createWorkflow" API can be called directly from the Web service layer as soon as the required configuration is stored in the Admin repository, calling the workflow service directly can result in a two-phase commit style problem. If the workflow is not available from the workflow service, then the Admin repository updates have to be rolled back and CreateDatabaseAPI call not accepted. To avoid such two-phase commit style issues, various embodiments utilize the sweeper architecture that is operable to sweep for new workflow activities to be started by looking at changes to the Admin repository records with a status set to be PENDING_CHANGES, for example.

Another architecture that can be utilized advantageously relates to providing secure communications to the host managers of the data plane from the components of the host plane. In one embodiment, the workflow and monitoring components of the control plane are constantly communicating with the host managers to perform various tasks (e.g., database maintenance and software installation), as well as to check the status of the various instances and/or repositories. It is important in at least some embodiments that all communications between the control plane and the host managers occur over a secure network that prevents anyone from eavesdropping or issuing unauthorized commands to the host managers.

In one embodiment, all communication channels to the host managers are secure using a hypertext transfer protocol over a secure socket layer (SSL). Each application server hosting a host manager application can be started using scripts at bootup of an instance. Before starting the application server engine, a script can be executed that generates a self-signed certificate and installs the certificate to enable the SSL communication channel(s). SSL communication is used in one embodiment for encrypting the communication channel and not for client authentication. Client authentication is instead achieved with a public/private key signature embedded in each request, such that in one embodiment all clients sign query string parameters using a private key. This signature can be validated by a custom interceptor, which can be deployed with the application server for the host manager. Further, a security group (i.e., firewall rules) can be established for each monitored instance in the data plane such that only hosts sitting in a given network or secure group can communicate using the host manager port. Secure information and credentials (such as private keys) can be stored in an appropriate keystore, which can provide for functionality such as key management and rotation.

Another architecture can be used to assist with software installation and maintenance. Software will generally need to be installed on instances in the data plane instances during various stages of the repository lifecycle. To create a repository, various binaries and/or seeds may need to be installed. After the repository is created, various patches may need to be applied to the database, as well as critical security patches that may need to be installed to the operating system. It thus can be desirable in some embodiments to build upon a flexible software installation architecture or framework that enables the installation of different types of software on the various instances. One of the key requirements of such a framework may be to not only to install new software, but also to provide information on the current set of installed software and the respective versions. It also can be desirable for such a framework to provide functionality to resolve conflicts during installation, verify the success of installation, and provide APIs or other mechanisms to query the list of installed software.

An installation framework in one embodiment takes advantage of a packet manager such as RPM (Red Hat Package Manager), which enables software to be distributed that is already compiled, such that the software can be installed with a single command. The software can be stored in a "bucket," such that the software can be installed from pre-defined URLs. An RPM or similar installer command can take the package's manifest file (which can be another URL) and the RPM URL as two different parameters. The installed RPMs will be signed by the control plane and/or by Red Hat, and both keys can be installed and maintained for the instances. Software installation in such a situation can be executed by a host manager, which can provide an "installSoftware" or similar API. Such an API can take into account parameters such as Package URL, Manifest URL, RetryCount, ForceInstall flag, and RPM root location). Upon invoking this API, the manifest file will be downloaded, and each item will be compared to the currently installed list of applications. If the item is already installed, then an attempt to reinstall will not be done unless a "force install" or similar flag is specified. To check whether an individual package has been installed, each host manager can provide a "getStatusofSoftware" or similar API. The "installSoftware" host manager API can be idempotent (as workflow may die and retry the step again) and asynchronous (as software installation takes a while to complete). These two aspects can be achieved by using a static object for synchronization, which can prevent a second "installSoftware" call from interfering with the first call.

An "installSoftware" API in accordance with one embodiment runs in a loop for a maximum of "RetryCount" times.

The API also removes any installation files which might exist from a previous failed attempt The API can download a manifest file and determine which items need to be installed, then download the file(s) or package from an appropriate repository or other source. The appropriate RPM files are then processed and installed. A final cleanup step then can be executed, regardless of the presence of any errors in the installation process.

The installation of the host manager application and any updates also can be managed for each instance, in a way that does not require taking down all the other instances. In one embodiment, an instance starts the application server engine at bootup, and the host manager is installed by calling the application server manager framework to deploy the new host application. As with other communications, the communication can be intercepted and the client authenticated before installing software or pushing updates to a host manager, which can be accomplished without affecting the availability of existing repositories.

Another aspect that can rely upon an underlying framework relates to repository and data backup. It can be desirable for the control plane to backup customer repositories and instance for various reasons, such as user-initiated backups (which can be performed during the backup time windows) and system-initiated backups during database restore, etc. A single framework can be implemented to handle both instances. To backup a repository, a framework can handle backing up both the data files and any associated log files. While various steps and processes will be described, it should be understood that various steps and approaches can differ from various database engines, such as MySQL and others.

An approach for backing up data in accordance with one embodiment suspends data operations until shapshots are taken of the appropriate data volumes, and the log files a similarly copied into an appropriate location. For example, an Admin tier can wait for the backup window before initiating a backup procedure. Once inside the backup window, the Admin tier can create a workflow that will create a workflow instance for repository backups. In one example, the workflow invokes a "supendDatabaseForBackup" or similar API for the host manager. This API can manage tasks to, for example, flush and lock the tables, suspend I/O to the data volume, create and mount an LVM snapshot for the log volume, create a log position file with the last log position, and start a timer to resume the database. This timer can be used to resume the repository in case the Admin tier hangs up while performing a task, such as taking snapshots, preventing the repository from being accidentally suspended for indefinite period of time. The workflow can poll the host manager for completion of these and/or other such tasks. Once the workflow has confirmed that the host manager has suspended the repository, the workflow can will attempt to backup the data volumes using a set of ordered tasks. For example, the workflow can indicate to create snapshots of each data volume, and verify that the snapshots have been successfully created. A row can be inserted for each snapshot volume in a location such as a backup_data_volumes table. Subsequently, the workflow can invoke a host manager's "resumeDatabaseFromBackup" or similar API. This process can copy the repository logs and log position information to an appropriate storage location, can unmount the log snapshot, remove log snapshot log volume, and unlock all tables. The Admin tier then can create a customer event that indicates the backup has been completed and the repository is again available.

As discussed, the log files also can be backed up in a similar fashion. The logs can be used to perform tasks such as replaying various transactions in case the data files have to be restored. The engine logs can be copied to an appropriate storage location, such that previously backed-up log files can be obtained using a simple list command. A host manager will use this result to determine whether there are logs that need to be copied. For example, the host manager can request a bucket list to obtain the list of log files written such that the last sequence can be backed up. If new logs have been created, it can first be determined that the logs are not actively being written to by a database engine, and then the logs can be copied and the copying verified to have been performed successfully.

Another aspect that can be handled by taking advantage of various frameworks includes the management of various security aspects, such as secure keys and user credentials. Secure information such as secure keys and passwords can be stored using a secure key management system or service, such as is described in U.S. patent application Ser. No. 12/372,597, filed on Feb. 17, 2009, issuing as U.S. Pat. No. 8,245,037 on Aug. 14, 2012, and entitled "Encryption Key Management," which is hereby incorporated herein by reference. Such a service can contain at least two versions for each credential, an 'OLD' version and the current version. A key can be rotated, for example, by uploading the new value for the key to the service, such as by using the base name for the key, and launching a workflow to propagate that key value to host managers as needed. Once that workflow is terminated successfully, such that each appropriate host has the new credential, the old version of the key can be effectively replaced with the new value. If, for any credential, the old key does not match the new key, that is an indication that a key rotation process is currently underway. A new key rotation is not started if the old key does not match the current key, as such an approach can risk losing credentials that may still be in use. A command line utility or similar interface can be used to push keys to the key management service, which can enforce this check.

A separate workflow can be defined for updating and/or rotating credentials such as host manager credentials on all host manager instances. Such an approach can utilize the same inputs as a "SendCredentials" or similar API on the each host manager, such as credential type, public key, and optional private key. In place of the credential value, however, the workflow can will accept the name of the key used to store that value in the key management service. The workflow can verify that the current value is different from the new value, and if the values are the same the workflow can terminate with an appropriate error condition. For each active host managed by the control plane, a sub-workflow can be launched that will send the new credential(s) to the host managers on each host. Once all the sub-workflows are complete, the new credential value can replace the old value. Any host that is created or reactivated while this workflow is in progress typically will need to be given the new version of the credential instead of the original.

A sub-workflow for sending the credentials to a host can utilize require the same inputs as the original workflow, as well as the host name and port for the specific host manager. The sub-workflow can call an "UpdateCredentials" or similar API on the host manager for each specified credential, and can call a "GetCredentials" or similar API on the host manager to verify that the update has completed. The host manager in at least one embodiment will not report the new value for the credential until everything has been done to put the credential in place. If all host managers are not updated within an appropriate period of time, such as two hours (where two hours is configurable and easy to update as required), the workflow can time out and generate an error ticket or other such indication of failure. All the root/admin credentials used by a host manager to communicate with a repository can be stored in the Admin repository in an encrypted form. When rotating the keys to encrypt passwords in the Admin repository, the new keys can be uploaded to the management service and a workflow launched to re-encrypt all appropriate user passwords using the new key. Once that workflow completes successfully, the new encryption key can be used. In addition to changing the encryption keys, this workflow can also change the root password for each database. A workflow for rotating password encryption keys can verify that the new encryption key is different from the old encryption key, encrypt any user passwords for in-flight workflows with the new key, and encrypt the root passwords for any inactive repositories with the new key. Since the repository is inactive, the passwords may not be changed but can be re-encrypted with the new keys. For each active repository, a new root password can be generated and stored in a pending changes field (encrypted with the new key) and a sub-workflow can be launched for updating host manager credentials with the new password. When the sub-workflow completes, the new root password can be written back to the data repository, using the new encryption key. The root database password will not be changed when a repository is inactive, but the workflow that reactivates the repository can change the root password once the repository is active.

An approach in accordance with one embodiment utilizes a command line utility that wraps a remote command and enforces restrictions on how credentials are rotated. This can guarantee that public and private keys are only rotated in tandem, and that no key is rotated if a previous rotation is still in progress. The utility can verify that the keys were successfully deployed to all hosts and then launch the appropriate workflow in the appropriate control plane environment. A command line utility can use a syntax such as:

```
rotate-rds-key \
    --stage One of Devo, Integ, QA, or Prod\
    --type credential_type\
    --publicKey value for public key \
    --privateKey optional for some types; value for private key
```

Such a utility can fail if the current key is different from the old key on any host in the fleet, there is an error copying the new key to any host in the fleet, or the workflow step could not be started. In the case where the keys are already different, there may be no changes to roll back. The utility can roll back any changes in the other cases and alert the user of cases where the roll back was unsuccessful.

In a case where a host manager instance dies during an "UpdateCredentials" or similar workflow, allowing the workflow to retry can handle many scenarios with no special logic on the workflow side. Workflow steps other than the step that is updating credentials may receive "MissingCredential" or similar exceptions from which the workflows will need to recover. In such cases, it can be acceptable to send the new credential to the host manager. In the case of a database administration password, the password change may not have taken effect. The workflow step that tries to re-send the root password (as well as any other call to Host Manager that requires the root password from other workflows) can fail with a "MissingCredentials" or similar exception. Workflow steps other than the change password workflow can attempt to set the credential to the new password and handle any failures. The workflow that is actively trying to change the password can first try sending the new password. If that succeeds, the workflow is done; otherwise, the workflow can retry with the old password followed by the new password. If the host manager receives an "UpdateCredentials" or similar call for the root password where the host manager does not currently have a password in memory, the host manager can attempt to connect to the repository using that password and fail if the connection cannot be established.

The rotations of various credentials and secure objects are accomplished in many instances without any noticeable impact on the customers. As the web service layer in many embodiments does not use any of these credentials as part of processing customer requests, the customer API calls can continue to proceed as normal. The impact of rotating a credential can vary somewhat depending on the type of credential being rotated. For example, when a new pair of Web services keys is generated, requests signed with the original pair may start to fail. This will only affect workflow steps, in general, which the workflow system can retry for a period of time. The new Web services credentials can be uploaded quickly to the management service in order to minimize the disruption to ongoing workflows. While workflows for generating and propagating new passwords are in progress, workflow boxes can have access to both old and new encryption keys, such that connections can be made to individual repositories and instances while each workflow is in progress. For host manager authentication keys, production hosts can have retry logic in place to retry connections with the old key if requests are being rejected. For RPM signing keys, host managers may be unable to install software for some time if a key is rotated.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of controlling at least a configuration aspect of a relational database using a control environment, comprising:
    under control of one or more computer systems configured with executable instructions,
        receiving a Web services call from a customer to the control environment through a control interface;
        analyzing the Web services call to determine an action to be performed with respect to the configuration aspect of at least one data instance of the relational database, the configuration aspect relating to at least one of creating, deleting, backing up, recovery, scaling, replicating, provisioning, upgrading, patch management, failover, or capacity management of the at least one data instance, the at least one data instance residing in a data environment that is separate from the control environment;
        storing information for the action to a job queue;
        extracting the information for the action from the job queue and generating a workflow based at least in part upon the information, the workflow comprising a series of tasks to be performed in the data environment with respect to the action;
        for each task of the workflow, sending state information for the task to a host manager for a host machine in the data environment operable to perform the task and return a response regarding performance of the task, a successful completion of each non-final task resulting in sending state information for a subsequent task of the workflow to the host manager; and
        when the response received from the host machine indicates that a final task of the workflow has been completed successfully, sending a notification to the customer that the action was successfully performed,
        wherein configuration of the at least one data instance by the customer is performed using the control interface of the control environment, and the customer is able to directly access the at least one data instance after the action is performed using a data interface of the data environment without accessing the control environment.

2. The computer-implemented method according to claim 1, further comprising:
    monitoring the job queue for information for additional actions to be performed with respect to the data environment.

3. The computer-implemented method according to claim 1, further comprising:

providing the customer with a DNS (domain name system) address and port information enabling the customer to access the relational database using the data interface.

4. A computer-implemented method of controlling at least a configuration aspect of a data environment using a control environment, comprising:

under control of one or more computer systems configured with executable instructions, analyzing a request received through a control interface of the control environment to determine an action to be performed with respect to the configuration aspect of at least one data instance in the data environment, the data environment being separate from the control environment;

generating a workflow for the action, the workflow comprising at least one task to be performed in the data environment with respect to the action;

for each task of the workflow, sending a task request to a component in the data environment operable to perform the task and return a response regarding performance of the task; and when the response received from the component indicates that a final task of the workflow has been completed, sending a notification through the control interface that the action was completed, wherein configuration of the at least one data instance by a user is performed exclusively via the control environment. and data in the data environment is accessible using a data interface of the data environment without accessing the control environment.

5. The computer-implemented method according to claim 4, wherein:
the data is stored in at least one relational database.

6. The computer-implemented method according to claim 5, wherein:
the request is a Web services call; and
the action includes provisioning one of the at least one relational database.

7. The computer-implemented method according to claim 4, wherein:
the action includes at least one of creating, deleting, backing up, scaling, replicating, provisioning, upgrading, patch management, failover, or capacity management of the at least one data instance in the data environment.

8. The computer-implemented method according to claim 4, wherein:
the request is a Web services call received to an externally-facing application programming interface (API) of the control environment.

9. The computer-implemented method according to claim 4, wherein:
the data interface is accessible using a DNS address for the at least one data instance.

10. The computer-implemented method according to claim 4, wherein:
the at least one task is selected from a group consisting of creating the at least one data instance, setting a storage volume of the at least one data instance, downloading binaries for a selected engine, backup and recovery of the at least one data instance, data replication and failover, creating and managing a security group, managing user credentials, managing key rotation and credential management, and attaching to hardware to support the at least one data instance.

11. The computer-implemented method according to claim 4, wherein:
the request is received to a Web services layer including components operable to perform at least one second task selected from a group consisting of authenticating users based on credentials, authorizing users, throttling user requests, user input validation, and marshalling or unmarshalling requests and responses.

12. The computer-implemented method according to claim 4, further comprising:
assembling the workflow using tasks selected based at least in part upon a database engine used for the at least one data instance corresponding to the request.

13. The computer-implemented method according to claim 4, further comprising:
logging event information for the data environment to a data store in the control environment.

14. The computer-implemented method according to claim 4, further wherein:
the component in the data environment is a host manager for a host machine operable to perform tasks in the data environment, the host manager being further operable to collect and monitor health information for at least one aspect of the data environment.

15. A computer-implemented method of maintaining a data environment using a control environment, comprising:

under control of one or more computer systems configured with executable instructions, provision at least one data instance in the data environment, the data environment being separate from the control environment;

periodically sending requests for status from a monitoring component of the control environment to at least one host manager in the data environment responsible for monitoring the at least one data instance;

receiving monitoring information from the at least one host manager which received one of the requests for status;

analyzing the monitoring information to determine an action to be performed with respect to the data environment and generating a workflow for the action, the action involving one or more aspects of configuring the at least one data instance and the workflow comprising at least one task to be performed in the data environment with respect to the action;

for each task of the workflow, sending state information for the task to the at least one host manager to perform the task and return a response with information regarding performance of the task, a successful completion of each non-final task resulting in sending the state information for a subsequent task of the workflow to the at least one host manager; and when the response received from the at least one host manager indicates that a final task of the workflow has been completed, storing the information for the action to a log for the data environment, wherein configuration of the at least one data instance by a user is performed via the control environment, and data in the data environment is accessible using a data interface without accessing the control environment.

16. The computer-implemented method according to claim 15, wherein:
the at least one data instance corresponds to a relational database in the data environment.

17. The computer-implemented method according to claim 15, further comprising:
in response to analyzing the request to determine the action to be performed, storing the information for the action to a job queue, wherein the information for the action is able to be extracted from the job queue to generate the workflow for the action.

18. The computer-implemented method according to claim 15, further comprising:
when the response is not received within a determined period of time, sending another request for status; and
when the response is not received after a determined number of requests, determining a second action to be performed with respect to the data environment and generating a second workflow for the second action.

19. The computer-implemented method according to claim 15, wherein:
the at least one host manager is operable to collect and monitor health information for at least one aspect of the data environment for use in generating the monitoring information.

20. A system for controlling a data environment using a control environment, comprising:
at least one processor; and
memory including instructions that, when executed by the at least one processor, cause the system to:
analyze a request received through a control interface of the control environment to determine an action to be performed with respect to a configuration aspect of at least one data instance in the data environment, the data environment being separate from the control environment;
generate a workflow for the action, the workflow comprising at least one task to be performed in the data environment with respect to the action;
for each task of the workflow, send a task request to a component in the data environment operable to perform the task and return a response regarding performance of the task; and
when the response received from the component indicates that a final task of the workflow has been completed, send a notification through the control interface that the action was completed,
wherein configuration of the at least one data instance by a user is performed via the control environment, and data in the data environment is accessible using a data interface of the data environment without accessing the control environment.

21. The system according to claim 20, further comprising:
an externally-facing API in the control environment operable to receive the request, wherein the request is a Web services call.

22. The system according to claim 20, wherein:
the data interface is accessible using a DNS address for one or more designated data instances that include the at least one data instance.

23. The system according to claim 20, further comprising:
a Web services layer in the control environment operable to receive the request and perform at least one second task selected from a group consisting of authenticating users based on credentials, authorizing users, throttling user requests, user input validation, and marshalling or unmarshalling requests and responses.

24. The system according to claim 20, further comprising:
a workflow component operable to assemble the workflow using tasks selected based at least in part upon a database engine used for the at least one data instance corresponding to the request.

25. A computer program product embedded in a non-transitory computer-readable storage medium and including instructions that, when executed by at least one computing device, cause the at least one computing device to:
analyze a request received through a control interface of a control environment to determine an action to be performed with respect to a configuration aspect of at least one data instance in a data environment, the data environment being separate from the control environment;
generate a workflow for the action, the workflow comprising at least one task to be performed in the data environment with respect to the action;
for each task of the workflow, send a task request to a component in the data environment operable to perform the task and return a response regarding performance of the task; and
when the response received from the component indicates that a final task of the workflow has been completed, send a notification through the control interface that the action was completed,
wherein configuration of the at least one data instance by a user is performed via the control environment, and data in the data environment is accessible using a data interface of the data environment without accessing the control environment.

26. The computer program product according to claim 25, further including instructions that, when executed by at least one computing device, cause the at least one computing device to:
provide an externally-facing APT in the control environment operable to receive the request.

27. The computer program product according to claim 25, further including instructions that, when executed by at least one computing device, cause the at least one computing device to:
provide a Web services layer in the control environment operable to receive the request and perform at least one second task selected from a group consisting of authenticating users based on credentials, authorizing users, throttling user requests, user input validation, and marshalling or unmarshalling requests and responses.

28. The computer program product according to claim 25, further including instructions that, when executed by at least one computing device, cause the at least one computing device to:
provide a workflow component operable to assemble the workflow using tasks selected based at least in part upon a database engine used for the at least one data instance corresponding to the request.

* * * * *